United States Patent
Ambrosini et al.

(10) Patent No.: US 6,633,872 B2
(45) Date of Patent: Oct. 14, 2003

(54) EXTENDIBLE ACCESS CONTROL FOR LIGHTWEIGHT DIRECTORY ACCESS PROTOCOL

(75) Inventors: Martin A. Ambrosini, Coral Springs, FL (US); Wendi L. Nusbickel, Boca Raton, FL (US); Brian E. Yoder, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 09/739,484

(22) Filed: Dec. 18, 2000

(65) Prior Publication Data

US 2002/0078004 A1 Jun. 20, 2002

(51) Int. Cl.[7] .............................................. G06F 17/30
(52) U.S. Cl. ............................................... 707/9; 707/1
(58) Field of Search ............................. 707/192, 2, 3, 707/4, 8, 9, 10, 200; 709/225, 229, 224; 713/201; 714/42

(56) References Cited

U.S. PATENT DOCUMENTS

| | | | | |
|---|---|---|---|---|
| 6,161,139 A | * | 12/2000 | Win et al. | 709/225 |
| 6,182,142 B1 | * | 1/2001 | Win et al. | 709/229 |
| 6,366,913 B1 | * | 4/2002 | Fitler, Jr. et al. | 707/9 |
| 6,453,353 B1 | * | 9/2002 | Win et al. | 709/229 |

* cited by examiner

*Primary Examiner*—Charles Rones
*Assistant Examiner*—Yicun Wu
(74) *Attorney, Agent, or Firm*—Akerman Senterfitt

(57) ABSTRACT

A method and system for providing access control using Lightweight Directory Access Protocol (LDAP). The method can include a series of steps which can include receiving from a user an LDAP operation directed to an LDAP search engine. The method can include associating the user with an access control group and reformatting the LDAP operation based on the access control group. Additionally, the step of providing the reformatted LDAP operation to the LDAP search engine can be included.

6 Claims, 4 Drawing Sheets

EXTENDIBLE ACCESS CONTROL FOR LIGHTWEIGHT DIRECTORY ACCESS PROTOCOL

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of directory services, and more particularly, to access control using Lightweight Directory Access Protocol (LDAP).

2. Description of the Related Art

A directory, similar to a database, can contain descriptive information and attributes associated with that information. An example of a directory can be an employee records directory for storing employee information. Other examples of directories can include telephone directories or property listings. The directory contains multiple entries, where an entry can correspond to the items of information which the directory can store. In the case of an employee directory, entries of the directory can be employee names or a unique index number associated with an employee name. Each entry of the directory can have one or more attributes, which can be any supplemental information or characteristic corresponding to the entry. Thus, an employee name attribute can be an item of personal employee information, as well as an employee telephone number, address, or a social security number.

Typically, information is read from a directory more often than information is written to the directory. Taking the previous example, although employee information must be updated periodically, much of the information within an employee record does not change from day to day. For example, an employee date of birth, if correctly entered in the directory, need not be updated. Similarly, an employee address need not be updated on a day to day basis, but rather, only when the employee relocates to a different residence. Because directories are accessed frequently using read operations, directories can be tuned for a high volume of search operations.

Lightweight Directory Access Protocol (LDAP) is a model for a directory service which runs over TCP/IP. LDAP-based directory service utilizes a hierarchical tree structure for storing information called a directory information tree. The directory information tree branches out from a root node where each branch or path leads to another related node of the directory information tree which can store a particular piece of information. Each particular node can be uniquely identified by the path of nodes taken from the root node to reach the particular node. This complete path, which is similar to a directory path for locating computer files, is called a distinguished name (DN). Thus, an entry can correspond to a particular node in the directory information tree, with related nodes above and below.

An attribute can include a type and one or more values such that an attribute type can indicate the type of information to follow. For example, the type "cn" denotes that a common name will follow. Thus, an example of an attribute can be "cn=John Doe" where "cn" is the type denoting that a common name will follow; and "John Doe" can be the value. In this case, "cn=John Doe" can be an attribute of a node closer to the root of the directory information tree, such as a department name, where other attributes beneath the department name can be other employees within that department. It should be appreciated that "cn=John Doe" also can be an entry of the directory information tree where related nodes can be the attributes of John Doe, such as John Doe's department, home address, and other related information. Other attributes can be assigned types as well. For example, an email address can be denoted as "mail" and a JPEG image can be denoted as "jpegPhoto". Thus, the value corresponding to "mail" can be an email address and the value corresponding to "jpegPhoto" can be a photo encoded in binary JPEG format.

Presently within the art, a standard method of controlling user access to directory services using LDAP has yet to be developed. Access Control Lists (ACLs), however, have been used in conjunction with LDAP and directory services in an effort to provide security features. Such implementations typically link a user access group to a particular user classification such as normal (not restricted), sensitive, or critical. Then, a user can be granted a particular set of permissions or privileges for accessing the directory service via access groups. However, using such a limited number of security classifications often does not provide the necessary granularity of access control to the directory service. In other words, ACLs can lack the number of security levels and search restrictions necessary for suitably controlling access to a directory service when using LDAP. Moreover, such solutions are not tailored to the specific access parameters of the directory service being accessed.

Other security implementations utilize attribute based security classifications. Specifically, such implementations can assign security classifications based on an attribute rather than the entry or DN. Using this access system, an entire attribute class within a directory is assigned a specific security classification. For example, in an employee directory, the address attribute can be assigned a sensitive security classification. Under this approach, each address of the directory, despite the address's corresponding DN, can be assigned the sensitive security classification. Similarly, telephone numbers can be assigned the critical security classification. In that case each telephone number, regardless of the number's corresponding DN, can be assigned the critical security classification. Similar to ACLs, assigning security classifications to an entire attribute class on a directory wide basis does not provide the necessary granularity of access control to a directory service when using LDAP.

SUMMARY OF THE INVENTION

The invention disclosed herein concerns a method and a system for providing extendible access control for Lightweight Directory Access Protocol (LDAP). The invention concerns reformatting a user specified LDAP operation to include application specific parameters within the LDAP operation. The application specific parameters can correspond to access control or security parameters of a directory service. After authenticating a user to an LDAP server, a user can be identified as belonging to a particular access control group. Based on the defined access control group, which can correspond to the user and one or more arguments of the LDAP operation specified by the user, one or more application specific parameters can be included within the user specified LDAP operation. After inclusion of the application specific parameters, the reformatted LDAP operation can be provided to an LDAP search engine. Notably, the invention can be implemented within the scope of LDAP as one or more application programs or plug-ins within an LDAP server.

The inventive method taught herein can begin by receiving from a user an LDAP operation directed to an LDAP search engine. The method can include associating the user with an access control group. The step of reformatting the LDAP operation based on the access control group can be included. The reformatting step can be including one or more application specific parameters in the LDAP operation. Additionally, the application specific parameters can correspond to the access control group, to parameters of a directory service, and to arguments of the LDAP operation. Notably, the parameters of the directory service can be security levels, permissions, or access rights. The method further can include the step of providing the reformatted LDAP operation to the LDAP search engine.

Another embodiment of the invention can be a method of providing access control using LDAP. The method can include receiving from a user an LDAP operation directed to an LDAP search engine. The step of associating the user with an access control group can be included. The method further can include reformatting the LDAP operation based on the access control group. Notably, the reformatting step can be including one or more application specific parameters in the LDAP operation where the application specific parameters correspond to the access control group. Additionally, the method can include the step of providing the reformatted LDAP operation to the LDAP search engine.

Another aspect of the invention can be a method of configuring an LDAP access control system. The method can include determining one or more application specific parameters within a directory service. The step of constructing at least one configuration file containing one or more of the application specific parameters corresponding to at least one LDAP access control group can be included. The configuration file can be contained within an LDAP server. The additional step of associating users with the LDAP access control group using a directory information tree can be included. The method further can include constructing an application program which can function as a plug-in within an LDAP server for including the application specific parameters within an LDAP operation.

Another aspect of the invention can be a system for providing access control using LDAP. The system can include a buffer for receiving an LDAP operation and user information, and a directory information tree containing one or more access control groups. The access control groups can be associated with one or more users. Also included in the system can be a configuration file for associating the access control group with one or more application specific parameters to be included in the received LDAP operation. Notably, the application specific parameters can correspond to parameters in a directory service. Further, an access control application, functioning as a plug-in within an LDAP server, for including the application specific parameters in the LDAP operation based upon the user information can be included in the system.

Another aspect of the invention can be a machine readable storage, having stored thereon a computer program having a plurality of code sections executable by a machine for causing the machine to perform a series of steps. The steps can include receiving from a user an LDAP operation directed to an LDAP search engine. The step of associating the user with an access control group can be included. The machine readable storage can cause the machine to perform the step of reformatting the LDAP operation based on the access control group. Notably, the reformatting step can be including one or more application specific parameters in the LDAP operation. The application specific parameters can correspond to the access control group, to parameters of a directory service, and to arguments of the LDAP operation. Notably, the parameters of the directory service can be security levels, permissions, or access rights. The step of providing the reformatted LDAP operation to the LDAP search engine can be included.

BRIEF DESCRIPTION OF THE DRAWINGS

There are shown in the drawings embodiments which are presently preferred, it being understood, however, that the invention is not so limited to the precise arrangements and instrumentalities shown, wherein.

DETAILED DESCRIPTION OF THE INVENTION

Figure 1:
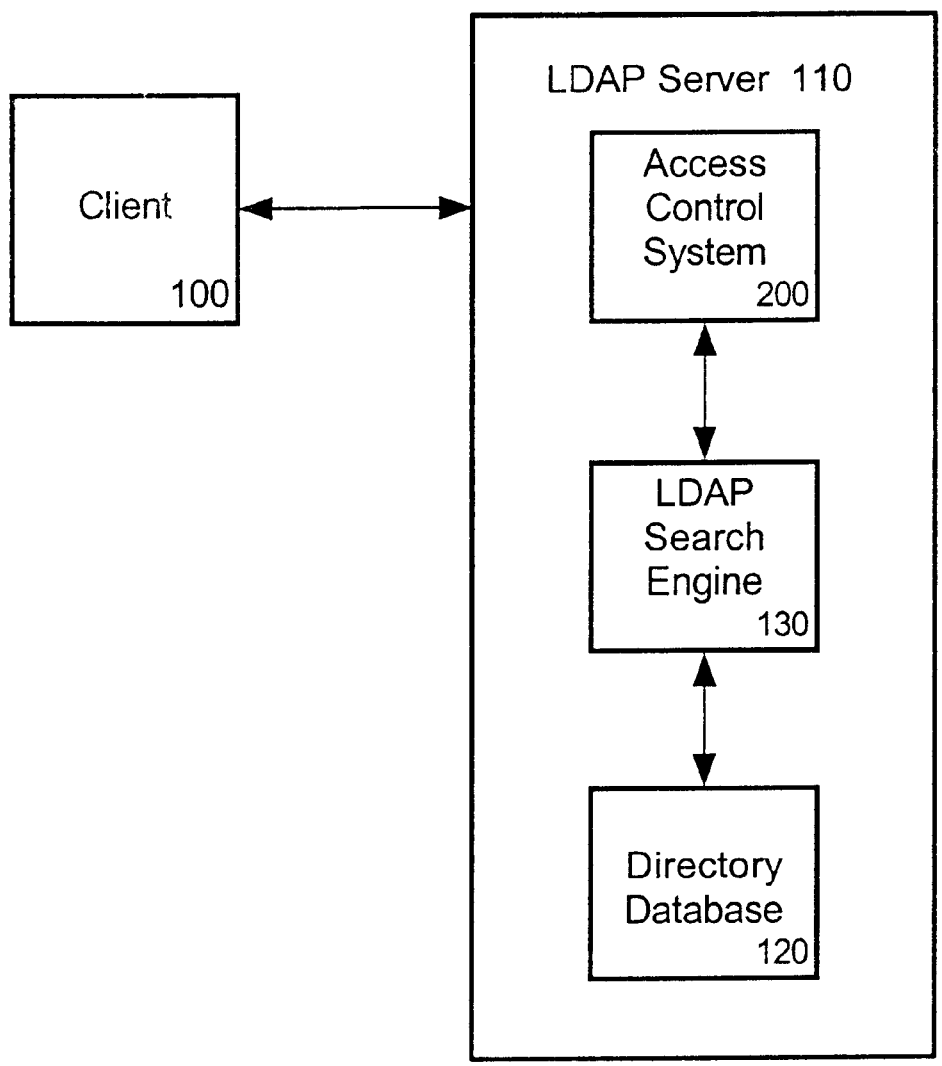
FIG. 1 is a block diagram illustrating an exemplary configuration utilizing the system of the invention.

The invention disclosed herein concerns a method and a system for providing extendible access control for Lightweight Directory Access Protocol (LDAP). More particularly, in the present invention a user specified LDAP operation can be received, in which the operation is directed to an LDAP search engine for accessing a directory service data. The received LDAP operation can be reformatted such that the resulting reformatted LDAP operation can be tailored to the particular directory service which the user is accessing. Further, additional arguments can be included within the LDAP operation, wherein the additional arguments can be used to control a user's level of access to the directory service data. Notably, the additional arguments can be application specific parameters.

Application specific parameters can be any parameter of a directory service or application to which LDAP serves as an interface, particularly, access control parameters, which can include permissions or other rights necessary to access the directory service data. After inclusion of one or more application specific parameters in the user specified LDAP operation, the reformatted LDAP operation can be provided to an LDAP search engine without any further processing. In this manner, the present invention provides a model for controlling a user's level of access to a directory service data within the scope of LDAP. Moreover, the invention provides an LDAP interface solution which can accommodate the access control requirements of a proprietary directory service or database, while being transparent to a user.

In operation, a user can be identified to an LDAP server through a conventional log in process where the user provides a user name or identifier and password. The user can provide the invention with an LDAP operation directed at the directory service to which LDAP is being used as an interface. The LDAP server can associate the user with an access control group. The access control group can be mapped to any application specific parameter corresponding to the directory to which the LDAP operation is directed. The access control groups, once mapped to application specific parameters, can indicate the level of access granted to the user when accessing the directory service data. For example, the application specific parameters can be security level designations, access rights or permissions, or other privileges required to access information in a proprietary directory service or database.

After receiving the user specified LDAP operation and identifying the user's access control group, the received LDAP operation can be reformatted. Specifically, any application specific parameters which correspond to the user's access control group can be included in the user specified LDAP operation. For example, if the user belongs to an access control group which can access only directory service entries having security levels of 1, 2, 4, 6, and 9, then these parameters can be included in the user specified LDAP operation. In this manner, the level of access granted to the user in accessing the directory service data can be controlled. Thus, when provided to an LDAP search engine, the resulting reformatted LDAP operation can only access LDAP entries having corresponding security classifications of 1, 2, 4, 6, or 9.

FIG. 1 is a schematic diagram depicting an exemplary computer communications network configuration suitable for use in the present invention. As shown in FIG. 1, the configuration can include a client 100 and an LDAP server 110. Information can be supplied bidirectionally between client 100 and LDAP server 110 through a computer communications network or the Internet. For example, LDAP server 110 can be an Internet web server or other server used within an intranet or other communications network, such as a telephone switching system. Additionally, client 100 can be a computer terminal connected to the Internet, or alternatively, a control terminal operated by a telephone operator, referred to as super-user, connected to a telephone switching system.

LDAP server 110, as is commonly known in the art, can contain an LDAP search engine 130 and a directory database 120 within a conventional LDAP-based computing environment. Additionally, LDAP server 110 can contain Access Control System (ACS) 200 in accordance with the inventive arrangements. LDAP server 110 can perform user authentication functions for identifying a user logging on to LDAP server 110 from client 100. LDAP server 110 also can receive LDAP operations from client 100. The received LDAP operations can be processed using ACS 200 and forwarded to the LDAP search engine 130, for accessing directory database 120. Additionally, LDAP search engine 130 can retrieve information from directory database 120 and provide information requested in the user specified LDAP operation to the client 100. It should be appreciated that the aforementioned examples are for illustration only and the invention is not so limited to the particular examples disclosed. For example, although directory database 120 is conventionally located within LDAP server 110, directory database 120 can be located in a separate server operatively connected to LDAP server 110 for receiving and responding to LDAP operations.

The ACS 200 can exist as one or more application programs or plug-ins within LDAP server 110 of FIG. 1. The ACS 200 can function with LDAP server 110 so as to receive user specified LDAP operations for processing. Based on the user information supplied via a user log in or authentication process, a user specified LDAP operation, and user data stored within LDAP server 110, the ACS 200 can reformat the received LDAP operation by including application specific parameters within the LDAP operation. The application specific parameters can correspond to the directory database 120 or other database. The reformatted LDAP operation can be provided to the LDAP search engine 130 within LDAP server 110 for accessing directory database 120.

Figure 2:
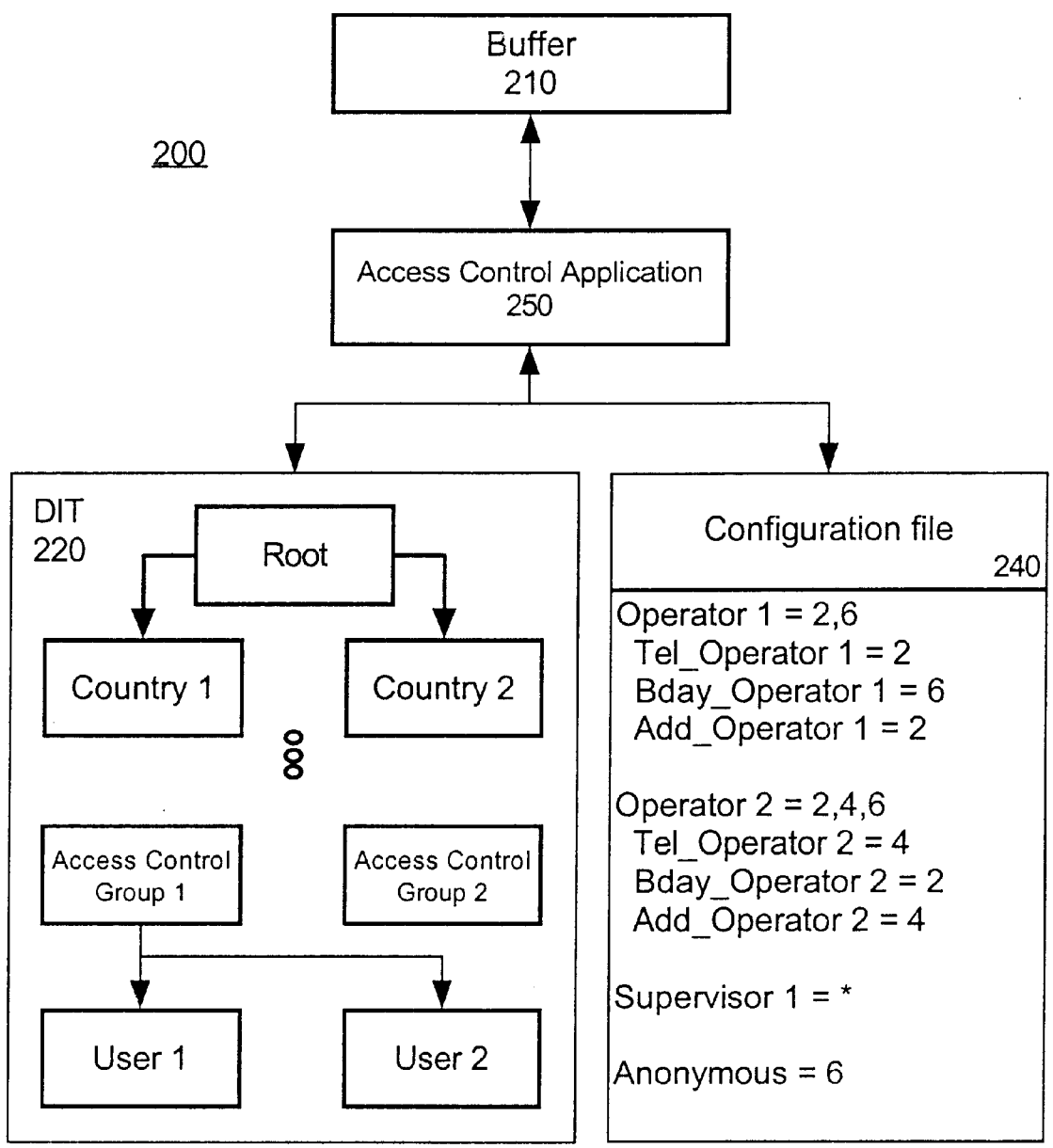
FIG. 2 is a schematic diagram illustrating an exemplary system for providing extendible access control using Lightweight Directory Access Protocol (LDAP).

An ACS 200 in accordance with the inventive arrangements is shown in FIG. 2. The ACS 200 can include a buffer 210, directory information tree (DIT) 220, a configuration file 240, and an access control application 250. Each of the aforementioned components can be located within LDAP server 110. Alternatively, the components of ACS 200 can be located in different computer systems in the case where ACS 200 is distributed among one or more different computer systems within a computer communications network. The buffer 210 can receive and store user information, user specified LDAP operations, and reformatted LDAP operations. Results from the execution of received LDAP operations, as well as reformatted LDAP operations, also can be stored in buffer 210.

Although the DIT 220 can be part of the directory database 120, portions of the DIT 220 can be modified to include information used in accordance with the inventive arrangements disclosed herein. For this reason, and for purposes of illustration, the DIT 220 is shown as part of ACS 200. The DIT 220 can be a hierarchical tree structure for storing information. The DIT 220 branches out from a root node where each branch or path leads to another related node of the DIT 220 which can store a particular piece of information. Each particular node can be uniquely identified by the path of nodes taken from the root node to reach the particular node. This complete path, which is similar to a directory path for locating computer files, is called a distinguished name (DN). Thus, an entry can correspond to a particular node in the directory information tree, with related nodes above and below.

The DIT 220 can contain the information of the directory service as well as user information used for authentication and access control. Directory service information, user information, and other access control information can be located at particular nodes of the DIT 220. For example, a particular node of the DIT can be known to the ACS 200 as the beginning of user information and access control information. Thus, that known node can serve as the base node for searching user information. Accordingly, as shown in FIG. 2, users can be grouped under one or more access control group nodes of the DIT such that the access control group contained in the path from the root to the particular user can be included in the user's unique DN. Access control groups can be associated with one or more application specific parameters for controlling the user's access to the directory database. Thus, FIG. 2 depicts user 1 and user 2 grouped beneath access control group 1, where user 1 and user 2 can have any access rights to the directory database which are associated with access control group 1.

The configuration file 240 can associate each access control group in the DIT 220 with one or more application specific parameters of the directory service. The application specific parameters can correspond to any parameter used by the directory service. An example of an application specific parameter can be a security level, or other directory specific right or privilege necessary for accessing information from the directory database. For example, if the directory service is an implementation of directory assistance which stores user addresses and telephone information, then the application specific parameters can correspond to security level classifications for restricting access to directory assistance information as specified by documentation available from Telcordia Technologies of Morristown, N.J.

It should be appreciated that incorporation of the configuration file 240 adds flexibility to the invention. Specifically, the invention can be updated regularly by altering the contents or application specific parameters of the configuration file 240. Moreover, the application specific parameters can be mapped to new or different access control groups. Use of the configuration file 240 also allows tailoring of the LDAP interface to suit the particular directory service to which the the LDAP operation is directed.

The access control application 250 can access received user information and LDAP operations from the buffer 210. Additionally, the access control application 250 can identify the user's access control group and application specific parameters by accessing the DIT 220 and the configuration file 240. The access control application 250, functioning as a plug-in within the LDAP server, can reformat the received LDAP operation to include any application specific parameters corresponding to the user's access control group.

In operation, a user can log on to an LDAP server by providing identifying information such as a user identifier and a password to the LDAP server. The user can be authenticated to the LDAP server 110 using authentication methods known in the art, such as Simple Authentication and Security Layer (SASL). The LDAP server can authenticate the user with the received identifying information to obtain the user's unique DN corresponding from the DIT 220. As mentioned, the DN for the authenticated user can contain the user's access control group, as well as a reference to each node in the path from the root to the particular node identifying the user. For example, the DN for the user logging on to the LDAP server can contain information such as the user's common name (cn), the user's access control group (ou), and other attributes of that particular user as specified by the nodes in the path from the root to the user's node. Such can be the case where a super-user logs on to the system. For example, an operator or other system administrator logging on to a intranet or a telephone switching system can provide a user name and password. Notably, the LDAP server would contain user verification and access control information for those users. Alternatively, a user not known to the system need not be logged in to the LDAP server. In that case, the user can be recognized as anonymous and given default access rights, such as when a user accesses an LDAP server from via the Internet.

Once a user has successfully logged onto the LDAP server, the resulting DN for that user can be referred to as a bind DN containing the LDAP access control group. Thus, the ACS 200 can identify a user's access control group in this manner. For example, if a user, "Mary Smith", provided a user Identifier and password to the LDAP server, the LDAP server could authenticate the user "Mary Smith" by locating an entry in the DIT 220 for "Mary Smith". The LDAP server can identify and produce an exemplary bind DN such as "dn: cn=Mary Smith, ou=Operator 1". In this case, the common name is "Mary Smith" and the LDAP server has linked "Mary Smith" to the access control group of "Operator 1". Notably, a user can be identified to the LDAP server as an anonymous user, where that classification entails granting limited access rights, or alternatively, no rights at all.

The user's specified LDAP operation also can be provided to the LDAP server in conjunction with the user's bind DN. Notably, the LDAP operation can be a request to access information from a directory database within the LDAP server, or alternatively, located on another server which can be queried by the LDAP server. For example, the operation can be a read, write, search, or compare operation, or any other LDAP defined operation and combinations thereof.

The ACS can read the user's access control group from the bind DN for that user. Configuration file 240 within the invention can contain a listing of access control groups mapped to application specific parameters. For example, if the directory service is directory assistance, the different levels of user access to information in directory assistance are defined in the Bellcore F20 Specification (BR 754-110-103, Issue 8, September 1998, Rev. 1, March 1991). Notably, Bellcore is presently known as Telcordia Technologies of Morristown, N.J. Thus, the application specific parameters can be security levels or access rights enumerated in the specification. For example, the following security levels can be defined: Emergency non-published, Privacy, Non-listed, Non-published, and Normal, each having corresponding access rights for accessing information from directory assistance. Within the directory service implementation of directory assistance, these security levels can be assigned an alphanumeric value which can be represented by the invention parameter "securityLevel" where Emergency Non-Published can be "0", Privacy can be "1", Non-Listed can be "2", Non-Published can be "4", and Normal can be "6". Accordingly, access control groups can be mapped to one or more alphanumeric characters or binary values used in the directory service which correspond to the application specific parameters.

For example, if the user "Mary Smith" initiated an LDAP operation requesting a listing for "J Doe" in "Traverse City", the ACS can identify Mary Smith's access control group. Taking the previous example, the access control group can be "Operator 1". Within the configuration file of the invention, the access control group "Operator 1" can be mapped to several application specific parameters. An exemplary listing in the configuration file can be "Operator 1=2,6". Thus, Mary Smith can be identified as having privileges of Non-listed and Normal access rights, the directory assistance security levels associated with the LDAP access control group "Operator 1". In this manner, directory assistance security levels can be associated with LDAP access control groups within the ACS 200. Notably, the access control group of "Supervisor 1" can be assigned a wildcard, such as "*" denoting that this access control group can access listings in the directory database having any security level or listing type. Alternatively, each listing type or security level accessible by the access control group "Supervisor 1" can be listed in the configuration file 240.

The configuration file 240 can include argument specific parameters. In that case, such additional parameters can provide increased flexibility to the LDAP operation. Rather than assigning application specific parameters based on the access control group associated with the user, the ACS can assign application specific parameters based on the argument included in the user's LDAP operation. Taking the previous example, where the access control group "Operator 1" is assigned security levels 2 and 6, a further argument specific access control group can be defined. For example, the configuration file 240 can contain the argument specific access control group "Tel_Operator 1" corresponding to telephone number based operations.

Thus, if a user identified as belonging to the "Operator 1" access control group initiates an LDAP search based on a telephone number rather than a common name, ACS 200 can include the security level assigned to "Tel_Operator 1" within the LDAP operation. Notably, the security levels associated with "Tel_Operator 1" can differ from the security levels associated with "Operator 1". In this manner, the ACS 200 can contain argument specific access control groups such that a user's level of access to a directory database can be based not only on the user's access control group, but also on the arguments of the user's LDAP operation. Thus, the ACS can include an argument specific access control group for any searchable parameter within the directory database.

After obtaining the user's access control group and corresponding application specific parameters, the ACS 200 can include those application specific parameters within the user requested LDAP operation. Thus, if the initial LDAP operation requested a listing for "J Doe" in "Traverse City", the invention can include the application specific parameters, in this case directory assistance security levels derived from the user's bind DN. Taking the previous example where the user had an access control group of "Operator 1" with corresponding security levels of 2 and 6, the resulting operation provided to the LDAP search engine can initiate a search for "J Doe" in "Traverse City", but will only search listings in directory assistance having security levels a 2 or a 6.

Figure 3:
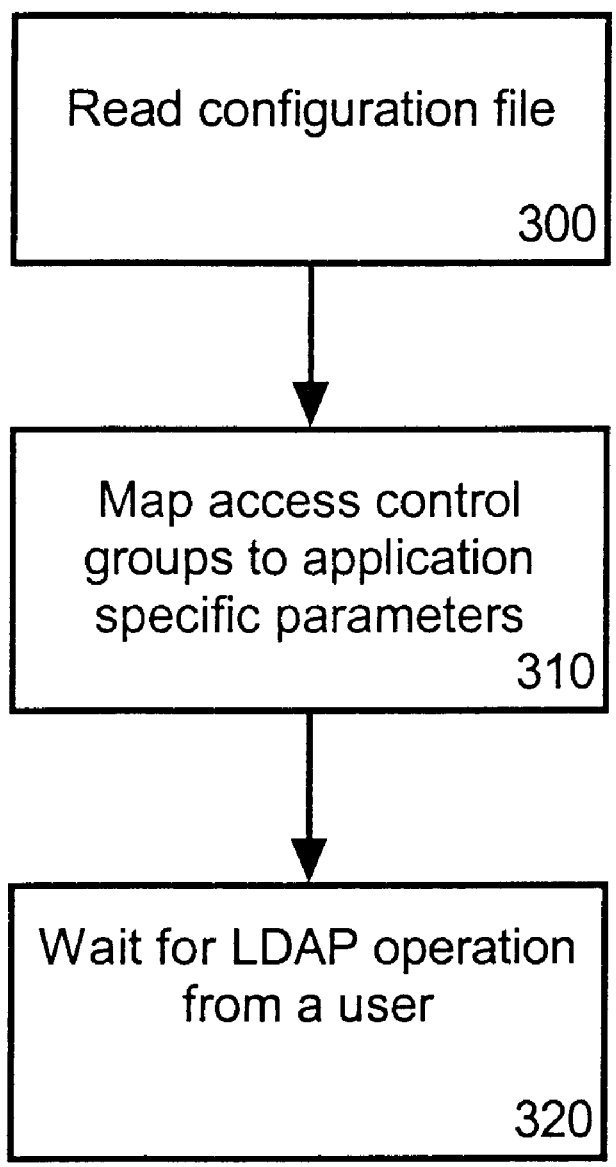
FIG. 3 is a flow chart illustrating an exemplary process for initializing the system of the invention.

FIG. 3 is a flow chart illustrating a process for initializing the ACS of FIG. 2. Beginning at step 300, the access control application of the ACS can read the configuration file which maps access control groups to application specific parameters. After completion of step 300, the ACS proceeds to step 310.

In step 310, the ACS maps each access control group defined in the configuration file to one or more application specific parameters. For example, in the case of directory assistance, the configuration file can contain the following access control groups: Operator 1, Operator 2, Supervisor 1, and anonymous. Further, each access control group can be mapped to one or more directory assistance security classifications. Thus, the Directory assistance security classifications can be the application specific parameters represented by the ACS parameter of "securityLevel". Accordingly, the configuration file can contain the following exemplary mapping of access control groups to listing security levels: Operator 1 to levels 2 and 6; Operator 2 to levels 2, 4, and 6; Supervisor 1 to all levels; and Anonymous to level 6, which can correspond to no access rights or minimal access rights. Thus, after completion of step 310, the ACS has mapped access control groups within LDAP to application specific parameters of a directory service or other access control parameters of an application or directory service. The system can continue to step 320.

In step 320, the ACS can enter a wait state until the ACS receives a user specified LDAP operation.

Figure 4:
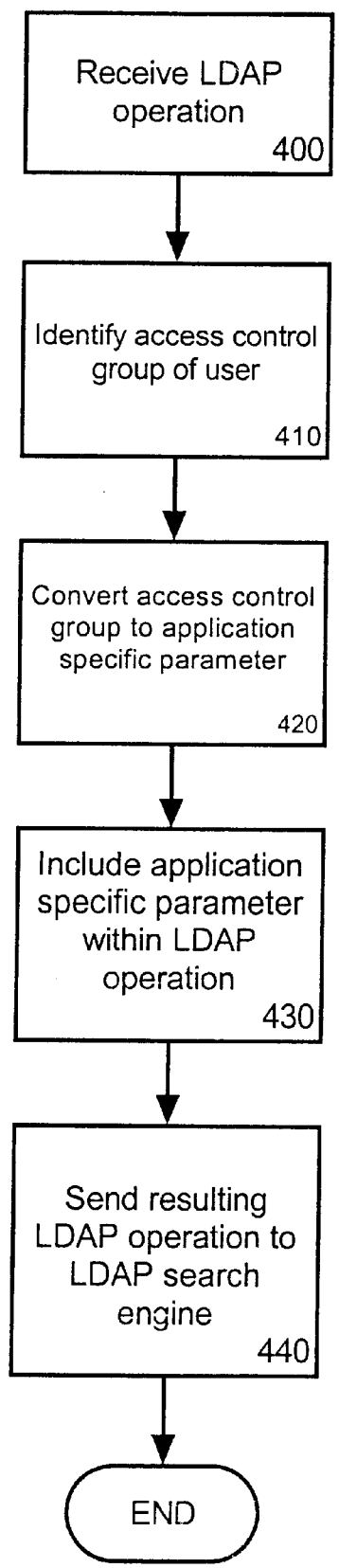
FIG. 4 is a flow chart illustrating an exemplary process for providing extendible access control using LDAP.

FIG. 4 is a flow chart illustrating a process for including application specific parameters within an LDAP operation. The process can begin after the exemplary initialization process of FIG. 3, and after a user has been authenticated by the LDAP server. Accordingly, at the outset of the process of FIG. 4, it is presumed that the user has already successfully logged on to the LDAP server using any of a variety of appropriate security protocols. Moreover, it is further presumed that because the user has provided identifying information, which can include a user identifier and password, the LDAP server can identify the user's bind DN. The bind DN, as previously mentioned, can be obtained from the DIT and can include the access control group of the user. Notably, if the user is not recognized by the LDAP server, the LDAP server can assign anonymous access rights to the user. In that case, the ACS can contain an access control group corresponding to an anonymous user having either limited or no access rights.

Beginning in step 400, the ACS receives an LDAP operation specified by the authenticated user. With the LDAP operation, the ACS can receive the bind DN containing the access control group associated with that particular user. After completion of step 400, the ACS can continue to step 410. In step 410, the ACS can identify the access control group of the user specifying the LDAP operation. The ACS can identify the access control group from the bind DN accompanying the LDAP operation. For example, the ACS can receive an LDAP operation which can contain a search filter of "(&(cn=J*Doe) (l=Traverse City))". The LDAP operation specifies that the user is searching for a person living in Traverse City with the last name of "Doe", and a first name beginning with "J". The ACS also can receive the bind DN of the user along with the user specified LDAP operation. For example, the bind DN can be "dn: cn=Mary Smith, ou=Operator 1". This exemplary bind DN specifies that Mary Smith is specifying the LDAP operation and that Mary Smith has an access control group of "Operator 1". Notably, the ACS can locate the access control group by searching the bind DN for the access control group identifier, which is "ou" in this case.

In another embodiment of the present invention, the ACS can identify another type of access control group called an argument specific access control group defined within the configuration file. Each access control group can be broken down into a number of argument specific access control groups. Specifically, for each searchable argument of an LDAP operation, the ACS can include an argument specific access control group for that argument. For example, if the directory database contains telephone numbers, birthdays, and addresses, the ACS can define an argument specific access control group for each of the aforementioned data types. The ACS can include a prefix before each access control group root denoting an argument specific access control group. For example, argument specific access control groups for the access control group "Operator 1" can be "Tel_Operator 1", "Bday_Operator 1", and "Add_Operator 1", corresponding to telephone number, birthday, and address arguments, respectively. Thus, particular LDAP operations not specifying a common name, but rather specifying particular arguments for locating a corresponding common name can be mapped to these argument specific access control groups. Notably, the application specific parameters corresponding to an access control group can differ from the application specific parameters corresponding to an argument specific access control group having the same root.

An exemplary LDAP operation which can trigger the use of an argument specific access control group can be (&(Tel=123-4567) (l=Traverse City)), where the user is searching for a name corresponding to the particular telephone number "123-4567" in "Traverse City". For example, although "Operator 1" can correspond to 2 and 6, "Tel_Operator 1" can correspond to only 2. The ACS can determine that the LDAP operation lacked a search argument corresponding to "cn", and accordingly, identify the search argument "Tel". Specifically, the user "Mary Smith" can search directory assistance using a telephone number to locate a corresponding name. Thus, rather than utilize the access control group "Operator 1" corresponding to the "cn=Mary Smith", the ACS can locate the argument specific access control group corresponding to the "Tel" argument with the "Operator 1" root. In this manner, the ACS can provide increased LDAP access capabilities based upon LDAP search arguments. For example, in this case, use of argument specific access control groups enables the ACS to define increased or decreased access control rights for users when searching directory assistance for a common name rather than a telephone number. After completing step 410, the ACS can continue to step 420.

In step 420, the ACS can convert the access control group or argument specific access control group identified in step 410 to one or more application specific parameters using the configuration file. Particularly, the application specific parameter can be a parameter existing within the directory service for which the LDAP server is functioning as an interface. Each application specific parameter can correspond to an alphanumeric character or other binary value. For example, in the case of directory assistance, the application specific parameters can be security levels. Thus, the access control group "Operator 1" can be mapped to Directory assistance security levels corresponding to Non-listed and Normal. For example, Non-listed can correspond to a 2 and Normal can correspond to a 6. In that case, the access control group "Operator 1" can be defined as "Operator 1=2,6" in the configuration file. By using the access control group to reference the configuration file, the ACS can convert the access control group into an application specific parameter.

If the ACS identifies an argument specific access control group based on the user requested LDAP operation, the ACS can identify the application specific parameters corresponding to the argument specific access control group. Notably, the parameters corresponding to an access control group can be different from the argument specific access control group having the same root. For example, although "Operator 1" can correspond to 2 and 6, "Tel_Operator 1" can correspond to only 2. Thus, the ACS can convert the argument specific access control group to an application specific parameter of 2 corresponding to Non-listed. After step 420, the system can proceed to step 430.

After obtaining one or more application specific parameters, in step 430, the ACS can reformat the user specified LDAP operation by including those application specific parameters within the LDAP operation. The reformatted LDAP operation can be provided to an LDAP search engine. Continuing with the previous example, the ACS can include the application specific parameters of directory assistance security levels in the LDAP operation. As mentioned, the original user requested LDAP operation can be "(&(cn=J*Doe) (I=Traverse City))" for searching for "J. Doe" in "Traverse City". Also, the bind DN can be "dn: cn=Mary Smith, ou=Operator 1". After obtaining the Directory assistance security levels corresponding to "Operator 1", the ACS can include those parameters within the original LDAP operation. Thus, the resulting LDAP operation can be "(&(cn=J* Doe) (I=Traverse City) (|(securityLevel=2) (securityLevel=6)))", where "securityLevel" is the ACS parameter name corresponding to security levels as implemented in the exemplary directory service implementation of directory assistance. After completion of step 430, the ACS can continue to step 440.

In step 440, the ACS can provide the resulting LDAP operation containing the application specific parameters to the LDAP search engine within the LDAP server. Consequently, the LDAP search engine can further act on the LDAP operation to access the directory database. The resulting exemplary LDAP operation, when processed by an LDAP search engine, results in a search for "J. Doe" in "Traverse City" and only accesses entries in directory assistance having security levels of 2 or 6. After completion of step 440, the ACS can end. It should be appreciated, however, that the steps of FIG. 4 can be performed as a constant loop where the system can restart at step 400 after receiving another LDAP operation from a user.

The present invention can be realized in hardware, software, or a combination of hardware and software. A method and system for extendible access control using LDAP according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which when loaded in a computer system is able to carry out these methods.

Computer program means or computer program in the present context means any expression, in any language, code or notation, of a set of instructions intended to cause a system having an information processing capability to perform a particular function either directly or after either or both of the following a) conversion to another language, code, or notation; b) reproduction in a different material form.

What is claimed is:

1. An access control method comprising:

receiving from a user a Lightweight Directory Access Protocol (LDAP) operation directed to an LDAP search engine;

determining an access control group associated with said user;

reformatting said LDAP operation based on said access control group by including one or more application specific parameters in said LDAP operation, said application specific parameters corresponding to said access control group, wherein said application specific parameters correspond to parameters of a directory service; and, providing said reformatted LDAP operation to said LDAP search engine.

2. The method of claim 1, wherein said parameters of a directory service are security levels, permissions, or access rights.

3. The method of claim 1, wherein said application specific parameters further correspond to arguments of said LDAP operation.

4. A machine readable storage, having stored thereon a computer program having a plurality of code sections executable by a machine for causing the machine to perform the steps of:

receiving from a user an LDAP operation directed to an LDAP search engine;

determining an access control group associated with said user;

reformatting said LDAP operation based on said access control group, including one or more application specific parameters in said LDAP operation, said application specific parameters corresponding to said access control group, wherein said application specific parameters correspond to parameters of a directory service, and, providing said reformatted LDAP operation to said LDAP search engine.

5. The machine readable storage of claim 4, wherein said parameters of a directory service include at least one selection from the group consisting of security levels, permissions, and access rights.

6. The machine readable storage of claim 4, wherein said application specific parameters further correspond to arguments of said LDAP operation.

* * * * *